(12) United States Patent
Bell et al.

(10) Patent No.: US 7,480,747 B2
(45) Date of Patent: Jan. 20, 2009

(54) METHOD AND APPARATUS TO REDUCE LATENCY AND IMPROVE THROUGHPUT OF INPUT/OUTPUT DATA IN A PROCESSOR

(75) Inventors: D. Michael Bell, Beaverton, OR (US); Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 11/147,991

(22) Filed: Jun. 8, 2005

(65) Prior Publication Data

US 2006/0282560 A1 Dec. 14, 2006

(51) Int. Cl.
*G06F 13/00* (2006.01)

(52) U.S. Cl. .............................. 710/33; 710/22; 710/38; 710/52; 709/231; 709/236; 711/100

(58) Field of Classification Search .................. 710/33, 710/1, 65, 105, 22; 709/226, 232, 249, 250, 709/230, 231, 236, 238, 239, 240, 243, 245; 718/100, 102; 370/465, 474, 389, 392, 395, 370/412, 419; 209/218; 711/135
See application file for complete search history.

(56) References Cited

U.S. PATENT DOCUMENTS

| | | | |
|---|---|---|---|
| 6,173,333 B1 * | 1/2001 | Jolitz et al. .................. 709/240 |
| 6,226,680 B1 * | 5/2001 | Boucher et al. ............. 709/230 |
| 6,266,701 B1 * | 7/2001 | Sridhar et al. ............... 709/232 |
| 6,286,061 B1 * | 9/2001 | Ross ............................ 710/33 |
| 6,289,382 B1 * | 9/2001 | Bowman-Amuah ......... 709/226 |
| 6,298,370 B1 * | 10/2001 | Tang et al. ................... 718/102 |
| 6,427,173 B1 * | 7/2002 | Boucher et al. ............. 709/238 |
| 6,557,060 B1 * | 4/2003 | Haren .......................... 710/65 |
| 6,591,302 B2 * | 7/2003 | Boucher et al. ............. 709/230 |
| 7,191,241 B2 * | 3/2007 | Boucher et al. ............. 709/230 |
| 7,227,870 B2 * | 6/2007 | Sano et al. ................... 370/419 |
| 7,237,031 B2 * | 6/2007 | Cheng ......................... 709/230 |
| 7,269,171 B2 * | 9/2007 | Poon et al. .................. 370/392 |
| 7,287,649 B2 * | 10/2007 | Hayter et al. ................ 209/218 |
| 7,394,823 B2 * | 7/2008 | Sano ........................... 370/419 |
| 2002/0042897 A1 * | 4/2002 | Klein et al. .................. 714/718 |
| 2003/0095559 A1 * | 5/2003 | Sano et al. ................... 370/419 |
| 2003/0103526 A1 * | 6/2003 | McBride et al. ............. 370/466 |
| 2006/0282560 A1 * | 12/2006 | Bell et al. ...................... 710/33 |

* cited by examiner

*Primary Examiner*—Henry H. W. Tsai
*Assistant Examiner*—Cheng-Yuan Tseng
(74) *Attorney, Agent, or Firm*—Schwegman, Lundberg & Woessner, P.A.

(57) ABSTRACT

Some embodiments include apparatus and method having a register circuit to receive a first portion of a packet from an input/output device, cache memory circuit to receive a second portion of the package, and a processing unit to process at least one of the first and second portions of the packet based on instructions in the processing unit. The processing unit and the register circuit reside on a processor. The first portion of the packet is placed into the register circuit of the processor, bypassing a memory device coupled to the processor. The second portion of the packet is placed into the cache memory circuit of the processor, bypassing the memory device.

20 Claims, 6 Drawing Sheets

METHOD AND APPARATUS TO REDUCE LATENCY AND IMPROVE THROUGHPUT OF INPUT/OUTPUT DATA IN A PROCESSOR

FIELD

Embodiments of the present invention relate to transferring of data in systems having processors.

BACKGROUND

Systems such as computers usually include processors to process data. In some systems, the performance of the processor is usually judged by the ability of the processor to process data on high speed network traffic from multiple sources. Although the speed of the processor is an important factor, the performance of the processor and the system also depends on factors such as how fast real time incoming data is transferred to the processor and how fast the system prepares outgoing data to be transmitted to the external source.

In some systems, real time data may be received and held in a memory device externally from the processor; the processor is subsequently notified to process the data only after some sufficient amount of data is received. Before the processor processes the data, the system may perform activities such as writing the data into the memory device, reading the data from the memory device, initiating interrupts, and controlling the flow of data. These activities introduce an unavoidable latency, which is a time measured from the time data is received by the system to the time the processor processes the data.

The latency associated with the handling of real time data in some conventional systems may limit the performance of the processors.

DESCRIPTION OF EMBODIMENTS

Figure 1:
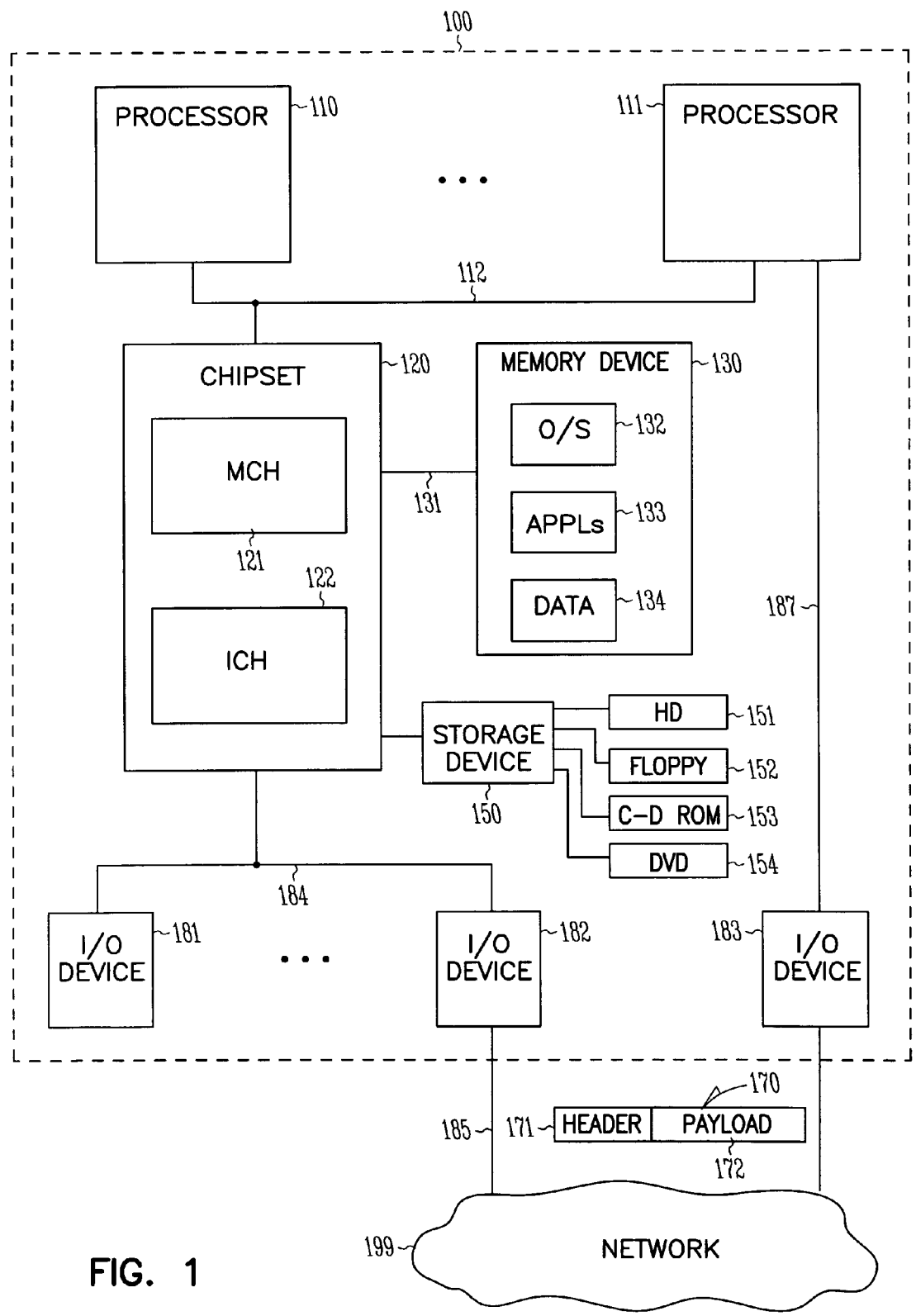
FIG. 1 shows a system according to an embodiment of the invention.

FIG. 1 shows a system according to an embodiment of the invention. System 100 includes processors 110 and 111, a processor interconnection 112, a chipset 120 having a memory control hub (MCH) 121 and an input/output (I/O) control hub (ICH) 122, a memory device 130, a memory interconnection 131, a storage device 150, I/O devices 181, 182, and 183, and an I/O interconnection 184. One of the I/O devices 181, 182, and 183 directly connects to one of the processors 110 and 111 via a dedicated connection that is separated from processor interconnection 112. For example, I/O device 183 directly connects to processor 111 via a connection 187. Connection 187 allows processor 111 and I/O device 183 to communicate directly with each other. In FIG. 1, some or all components of system 100 may reside on a circuit board such as a circuit motherboard.

In some embodiments, I/O interconnection 184 includes a bus that complies with the Peripheral Component Interconnect (PCI) Specification, Revision 2.2, Dec. 18, 1998. In other embodiments, I/O interconnection 184 includes a bus that complies with PCI-X Specification, Revision 1.0a, Jul. 24, 2000. In some other embodiments, I/O interconnection 184 includes a bus that complies with PCI-Express (PCI-E) Specification, Revision PCI-E, as specified in "The PCI Express Base Specification of the PCI Special Interest Group", Revision 1.0a. All of the PCI specifications are available from PCI Special Interest Group, Portland, Oreg., USA. In this specification, the term "PCI" refers to any one of the PCI, PCI-X, and PCI-E mentioned above.

System 100 further includes network interconnections 185 and 186 to communicate with a network 199. Examples of network interconnections 185 and 186 include any combination of communication media such as metal wires, glass or fiber cables, and wireless media. Examples of network 199 include any combination of a local area network (LAN), a storage area network (SAN), and the internet.

Processors 110 and 111 include central processing units (CPUs) of any type of architecture, for examples, embedded processors, micro-controllers, digital signal processors, superscalar computers, vector processors, single instruction multiple data (SIMD) computers, complex instruction set computers (CISC), reduced instruction set computers (RISC), very long instruction word (VLIW), and hybrid architecture. In some embodiments, processors 110 and 111 are compatible with the Intel® Architecture (IA) processor, such as the IA-32 and the IA-64 architectures. In some embodiments, at least one of the processors 110 and 111 includes a multi-core processing unit formed on a single chip.

FIG. 1 shows system 100 having two processors and one memory controller for illustrative purposes; any combination of processors and memory controllers may be used in system 100. For example, a combination of one processor or more than two processors and one or more memory controllers may be included in system 100. Further, in some embodiments, a memory controller such as MCH 121 may reside inside at least one of the processors 110 and 111.

Processor interconnection 112 provides interface signals to allow processors 110 and 111 to communicate with each other and with other devices, such as with chipset 120. Examples of processor interconnection 112 include parallel bus, sequential bus, pipelined bus, asynchronous bus, synchronous bus, or any combination of these buses. FIG. 1 shows interconnection 112 as a single line to illustrate interconnections between chipset 120 and processors 110 and 111. In some embodiments, interconnection 112 includes a combination of multiple separate interconnections connected between chipset 120 and processors 110 and 111. For example, interconnection 112 may include two separate point-to-point buses: a first point-to-point bus connected between chipset 120 and processor 110, and a second point-to-point bus connected between chipset 120 and processor 111.

Memory control hub MCH 121 provides control and configuration to memory device 130 and input/output control hub ICH 122. In some embodiments, MCH 121 includes functions such as host-to-peripheral or processor-to-peripheral bus interface functions to support communication between processors 110 and 111 and other devices such as memory device 130.

Input/output control hub ICH 122 provides support for communication with I/O devices such as I/O devices 181 and 182. In some embodiments, ICH 122 includes a number of interface and I/O functions such as PCI bus interface, processor interface, interrupt controller, direct memory access (DMA) controller, power management logic, timer, universal serial bus (USB) interface, mass storage interface, and low pin count (LPC) interface. In some embodiments, ICH 122 is integrated into MCH 121 to perform the interface and I/O functions.

Memory device 130 stores information such as an operating system (OS) 132, applications (APPLs) 133, and data 134. Applications 133, as discussed herein, include software programs. Examples of applications 133 include Web browsers, e-mail serving applications, file serving applications, and database applications. An operating system, as discussed herein, relates to software for controlling communication between applications, such as applications 133, and resources of system 100 such as processors 110 and 111, chipset 120, I/O devices 181, 182, and 183, and memory device 130.

In some embodiments, memory device 130 includes a dynamic random access memory (DRAM) device. In other embodiments, memory device 130 includes a static random access memory (SRAM) device. In some other embodiments, memory device 130 includes a flash memory device.

Storage device 150 includes machine-accessible media, for example, a hard disk (HD) 151, a floppy disk 152, a compact disk Read Only Memory (CD-ROM) 153, a digital versatile disc (DVD) 154, and any other magnetic or optical memory devices. Storage device provides a mechanism to read machine-accessible media.

In some embodiments, one or more of the machine-accessible media such as hard disk 151, a floppy disk 152, CD-ROM 153, and DVD 154 have associated information, wherein the information, when accessed, results in a machine performing the functions and methods described herein.

I/O devices 181, 182, and 183 may include any combination of circuitry residing on a circuit board and circuit cards plugged into sockets on the circuit board. Examples of I/O devices 181, 182, and 183 include media cards such as audio cards, video cards, graphics cards, and communication cards to receive and transmit data via wireless media. Other examples of I/O devices 181, 182, and 183 include host bus adapters (HBAs) such as PCI-E host bus adapters. Further examples of I/O devices 181, 182, and 183 include network interface cards (NICs) such as Token Ring NIC and Ethernet NIC.

FIG. 1 also shows a packet 170 including a header 171 and a payload 172. Packet 170 represents both data transferred from system 100 to network 199 and data transferred from network 199 to system 100 via network interconnection 185 or 186. Data transferred from system 100 to network 199 may be different from data transferred from network 199 to system 100. Data transferred from system 100 to network 199 is also referred to as outgoing data or outgoing packet. Thus, the outgoing packet 170 includes outgoing header 171 and outgoing payload 172.

In some embodiments, packet 170 includes data that complies with a protocol including TCP/IP (Transmission Control Protocol/Internet Protocol). Packet 170 includes a number of data bits. In some embodiments, data is transferred between system 100 and network 199 at the speed of multiple gigabits per second. In some of the processes of system 100, memory device 130 is bypassed when packet 170 is transferred within system 100.

In some embodiments, when packet 170 is transferred from system 100 to network 199, packet 170 is directly transferred from one of the processors 110 and 111 to one of I/O devices 181, 182, and 183. In these embodiments, memory device 130 is bypassed such that packet 170 is directly transferred to one of I/O devices 181, 182, and 183 without transferring or placing packet 170 into memory device 130.

When packet 170 is transferred to system 100, one of the I/O devices 181, 182, and 183 initially receives the packet. In some embodiments, after one of the I/O devices 181, 182, and 183 receives packet 170, the entire packet is directly transferred from one of the I/O devices 181, 182, and 183 to at least one of the processors 110 and 111, bypassing memory device 130. In other embodiments, after one of the I/O devices 181, 182, and 183 receives packet 170, only header 171 is directly transferred from one of the I/O devices 181, 182, and 183 to at least one of the processors 110 and 111, bypassing memory device 130. Thus, in system 100, after one of the I/O devices 181, 182, and 183 receives packet 170 from network 199, at least a portion of the packet is directly transferred from I/O devices 181, 182, and 183 to at least one of the processors 110 and 111.

Bypassing memory device 130 may reduce or eliminate latency associated with memory access and latency associated with interrupts between components of system 100. The throughput of processor 110 or 111, or system 100 may be improved when the latencies is reduced or eliminated.

In some embodiments, in addition to transferring at least a portion of packet 170 directly to at least one of the processors 110 and 111, one of the I/O devices 181, 182, and 183 may also transfer a packet descriptor associated with packet 170 directly to at least one of the processors 110 and 111. The packet descriptor associated with packet 170 carries information about packet 170. For example, the packet descriptor associated with packet 170 may carry information about the validity of the checksum of packet 170.

As shown in system 100, since packet 170 may be directly transferred between at least one of the processors 110 and 111 and one of the I/O devices 181, 182, and 183, an external offload engine module with an additional offload processor and offload memory device is not needed.

In system 100, different transfer paths are available to transfer a portion of packet 170 or the entire packet 170. For example, a portion of packet 170 or the entire packet 170 may be directly transferred between I/O device 183 and one of the processors 110 and 111 via I/O via connection 187. As another example, a portion of packet 170 or the entire packet 170 may be directly transferred between I/O device 182 and one of the processors 110 and 111 via I/O interconnection 184 and processor interconnection 112 through chipset 120.

FIG. 1 shows only one packet for clarity. In some embodiments, multiple packets are transferred between system 100 and network 199 in a fashion similar to the fashion that packet 170 is transferred.

The above description describes a transfer of packet 170 within system 100 in which memory device 130 is bypassed in some cases. Bypassing memory device 130 in these cases may reduce or eliminate latency associated with accessing memory device 130 and latency associated with interrupts between components of system 100 such as between processors 110 and 111 and I/O devices 181, 182 and 183. The throughput or performance of processor 110, processor 111, or system 100 may be improved when these latencies are reduced or eliminated.

Figure 2:
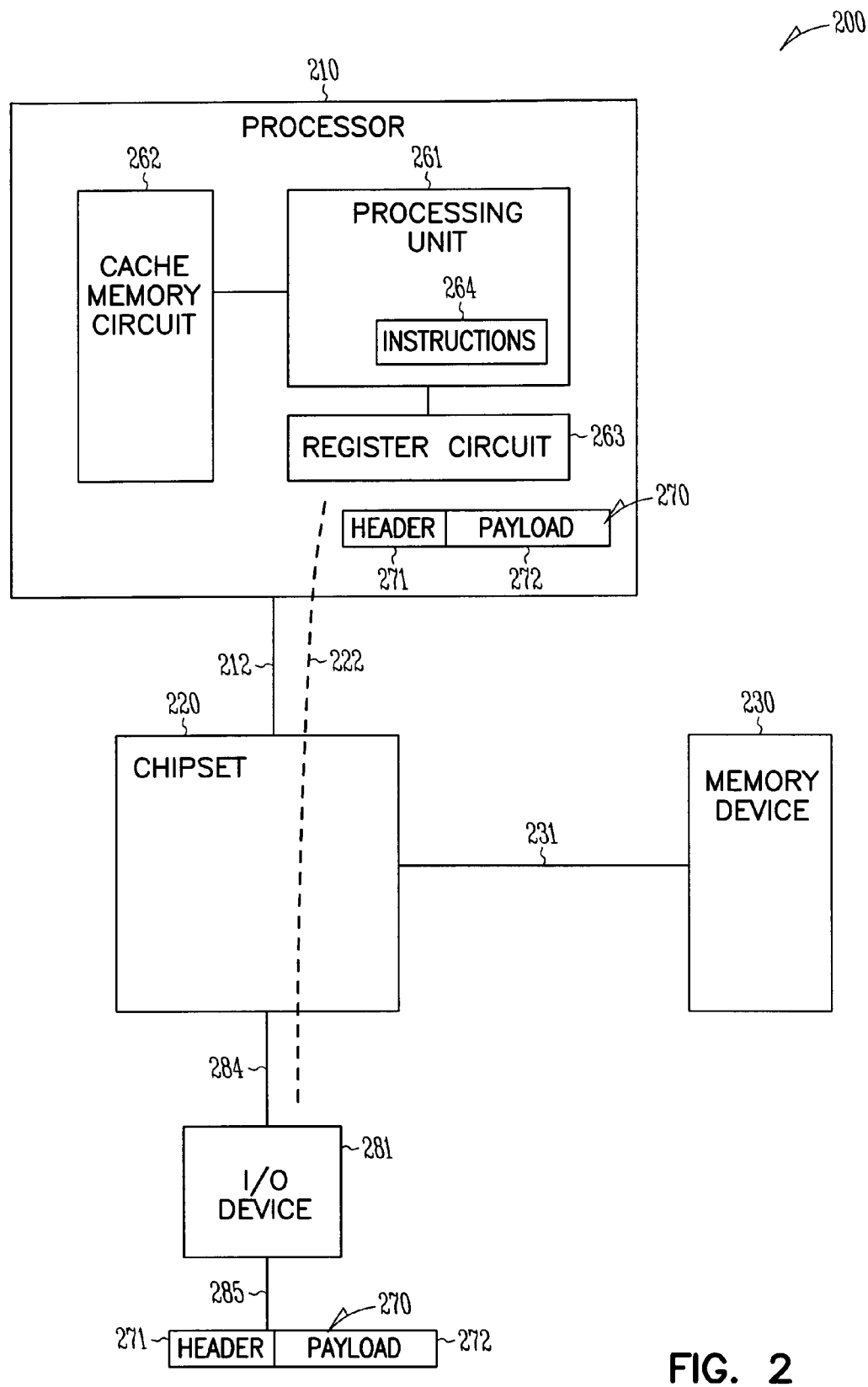
FIG. 2 through FIG. 4 show systems according to other embodiments of the invention.
Figure 3:
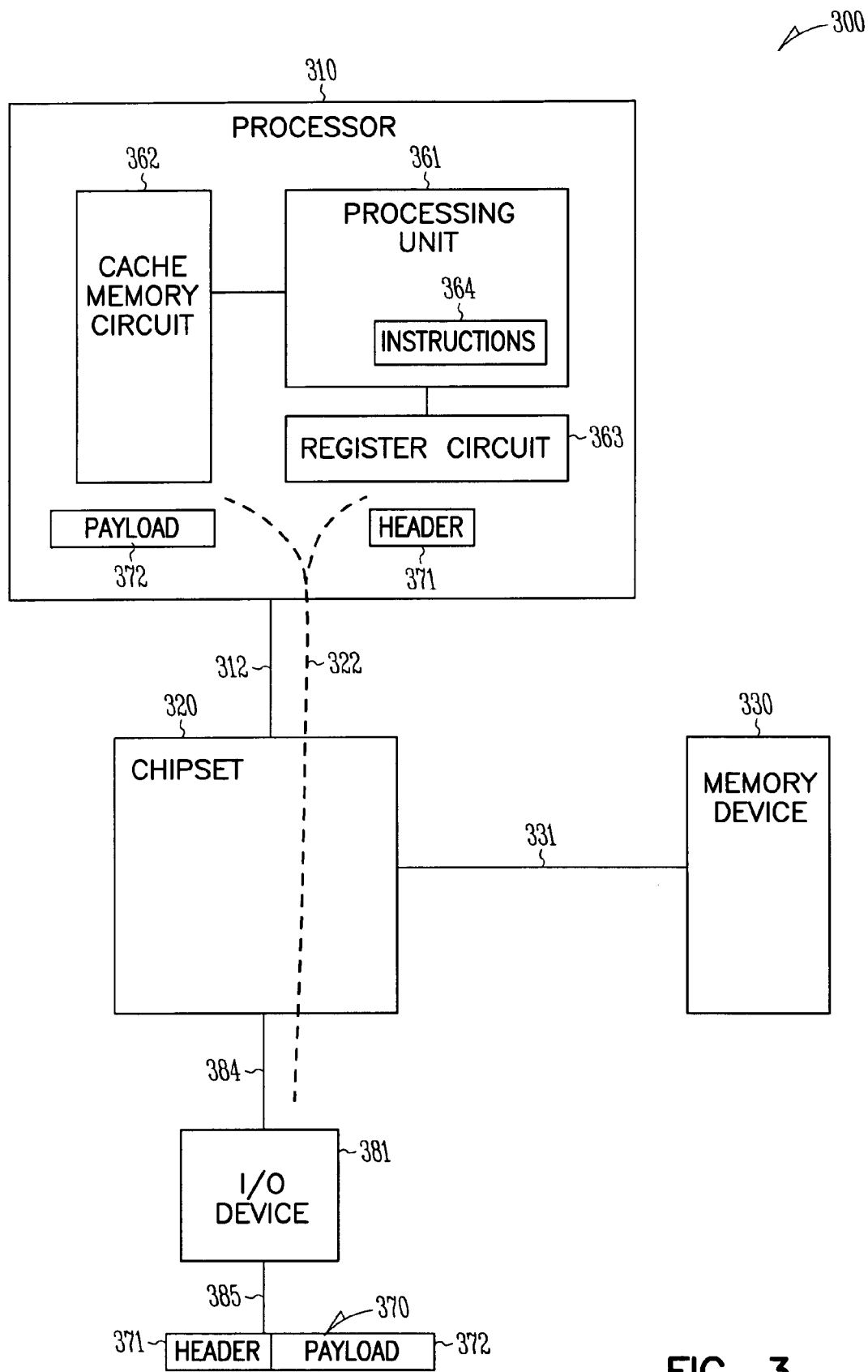
Figure 4:
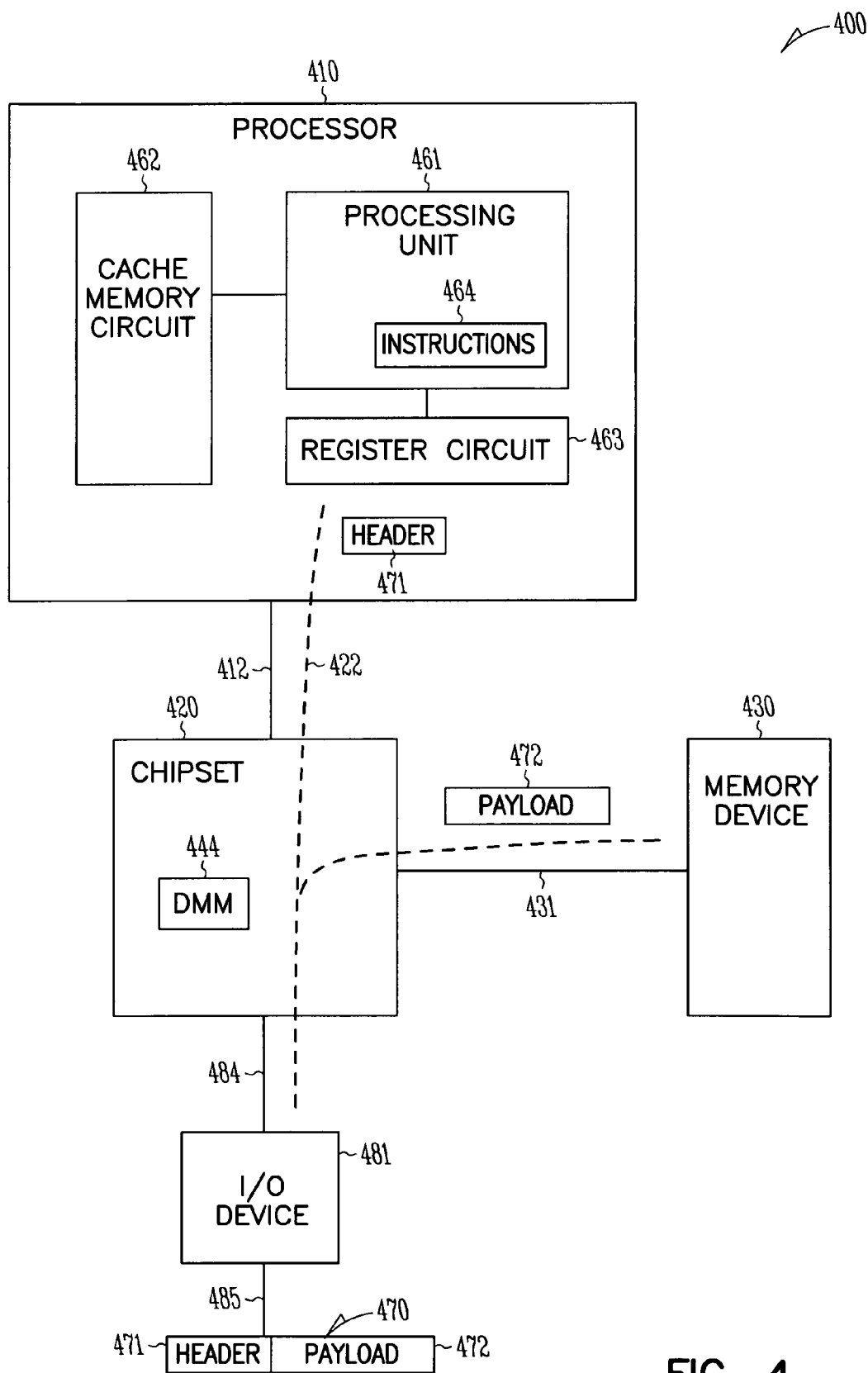

FIG. 2 through FIG. 4 show systems according to other embodiments of the invention. In FIG. 2, system 200 includes a processor 210, a processor interconnection 212, a chipset 220, a memory device 230, a memory interconnection 231, an I/O device 281, and I/O interconnection 284. A packet 270 represents data transferred to and from system via interconnection 285. Packet 270 includes a header 271 and a payload 272. In some embodiments, packet 270 includes data that complies with a protocol including TCP/IP. FIG. 2 shows only one packet for clarity. In some embodiments, system 200 transfers multiple packets; the multiple packets are transferred to and from system 200 in a fashion similar to the fashion that packet 270 is transferred. As shown in FIG. 2, packet 270 is transferred directly between I/O device 281 and processor 210 via a transfer path 222, bypassing memory device 230.

Processor 210 includes a processing unit 261, a cache memory circuit 262, and a register circuit 263. Processing unit 261 processes data based on instructions 264. Instructions 264 include machine-executable codes. Cache memory circuit 262 holds instructions and data recently used by processor 210. Register circuit 263 includes register cells to hold data including data represented by packet 270 and any packet descriptor associated with packet 270. In some embodiments, register circuit 263 also includes control logic to detect the arrival packet 270 and to execute codes to cause processing unit 261 to process packet 270. For clarity, FIG. 2 omits details of the components of processor 210 to concentrate on the subject matter of the embodiments of the invention. In some embodiments, processor 210 is compatible with the Intel® Architecture (IA) processor, such as the IA-32 and the IA-64 architectures.

In some embodiments, processor 210 includes multiple cores in which each of the multiple cores includes a copy of processing unit 261, a copy of cache memory circuit 262, and a copy of register circuit 263. In these embodiments, processor 210 may use one or more of the register circuits such as register circuit 263 in the cores to directly transfer packet with I/O device 281, bypassing memory device 230.

In FIG. 2, after packet 270 is received by I/O device 281, both header 217 and payload 272 of packet 270 are placed directly into register circuit 263. As shown in FIG. 2, neither header 271 nor payload 272 of packet 270 is transferred from I/O device 281 to memory device 230. Thus, in system 200, neither a copy of header 271 nor a copy of payload 272 is placed into memory device 230 when header 271 and payload 272 are transferred from I/O device 281 to register circuit 263.

In some embodiments, placing packet 270 directly into register circuit 263 allows processing unit 261 to begin processing packet 270 without searching cache memory circuit 262 for information associated with packet 270. Therefore, system 200 may reduce or eliminate a latency associated with a cache search when processing of a packet such as packet 270. In some embodiments, processing unit 261 processes packet 270 by performing tasks such as verifying the content of header 271 to ensure that the header complies with a protocol, and transferring payload 272 to an appropriate location is system 200 to be stored in a location in system 200 or to be used by an application.

Further, placing packet 270 directly into register circuit 263 reduces the number of times that packet 270 is moved from one location in memory device 230 to another location in memory device 230 when packet 270 is used by an application such as applications 133. For example, some conventional systems may have a memory device similar to memory device 230. In these conventional systems, an I/O device may initially place a packet such as packet 270 in an initial memory location of the memory device. The initial memory location may be a memory location designated by a device driver associated with the I/O device. When an application in these conventional systems is ready to use the packet, the packet may be moved from the initial memory location to a second memory location. The second memory location may be a memory location designated by the application. Thus, in the conventional systems, the packet is moved between different memory locations within the memory device before the application can access the packet. In system 200 of FIG. 2, the movement of the packet such as packet 270 from the initial memory location to the second memory location is omitted. Instead, packet 270 may be moved from register circuit 263 directly to the application's designated memory location when the application is ready to use packet 270. Since the movement of packet 270 within memory device 230 is omitted, system 200 may have a reduced memory bandwidth requirement and may process packet 270 in an amount of time less than that of the conventional systems. Thus, the performance of system 200 may be improved.

In some embodiments, the placement of packet 270 into register circuit 263 triggers a light weight thread (LWT) to execute such that packet 270 is quickly processed without using a substantial processing resource of processor 210. Processor 210 performs a process by executing one or more threads. A thread includes a number of instructions to perform a task. The light weight thread discussed herein may include a reduced number of instructions compared with that of the thread. In processor 210, the light weight thread may be stored in a location such that the light weight thread is quickly executed upon the arrival of packet 270. The reduced instructions and the ability to quickly execute of the light weight thread allow packet 270 to be promptly processed.

In other embodiments, instead of using the light weight thread, an internal interrupt method may also be used by processor 210 to process packet 270. For example, upon the arrival of packet 270 at register circuit 263, processor 210 may initiate an internal interrupt service routine to service packet 270.

As discussed previously, in some conventional systems, the packet is placed into a memory device after the packet is received from a network. In these conventional systems, the I/O device may signal the processor with an interrupt request only after a predetermined number of packets has already placed into the memory device. Thus, in some conventional systems, a latency exists between the time the packets are placed into the memory device and the time the processor receives the interrupt request from the I/O device. Besides the wait for an interrupt request from the I/O device, an additional latency may also exist when the processor retrieves the packet from the memory device.

In comparison with some conventional systems, system 200 of FIG. 2 may reduce or eliminate the latency associated with interrupt request from the I/O device. In system 200, since packet 270 is directly placed into register circuit 263, an interrupt request from I/O device 281 to processor 210 may not be necessary because register circuit 263 may trigger the light weight thread upon the arrival of packet 270 so that processing unit 261 may quickly start processing packet 270. Thus, in system 200, processing unit 261 may start to process packet 270 without the need to receive from I/O device 281 an interrupt request associated with packet 270.

Moreover, in system 200, since packet 270 is directly placed into register circuit 263, retrieving the packet from a memory device such as memory device 230 is unnecessary. Thus, in system 200, the latency associated with the retrieval of the packet from the memory device is eliminated, thereby improving the throughput of processor 210.

As described above, processing unit 261 starts to process a packet, such as packet 270, each time the packet is placed in register circuit 263. In some embodiments, processor 210 is configured such that processing unit 261 starts to process packets placed into register circuit 263 after placements of multiple packets instead of after a placement of each packet. For example, an internal interrupt may be set up in processor 210 such that processing unit 261 only starts to process packets placed into register circuit 263 after X packets are placed into register circuit 263, where X is an integer greater than two.

In embodiments represented by FIG. 2, packet 270 is transferred to register circuit 263 of processor 210 on transfer path 222 via chipset 220 and processor interconnection 212. In some embodiments, packet 270 is transferred directly to processor 210 via a dedicated connection that connects directly between processor 210 and I/O device 281. For example, packet 270 may be transferred directly to processor 210 via a direct connection such as connection 187 of FIG. 1. A further reduction in latency may be achieved when a direct connection is used because chipset 220 may not be directly involved in the transfer of packet 270 from I/O device 281 to processor 210.

The above description describes a direct placement of packet 270 into register circuit 263 of processor 210 when packet 270 is transferred to system 200. As mentioned above, packet 270 also represents data transferred from system 200. When packet 270 is transferred from system 200, packet 270 is initially transferred to I/O device 281 by a component within system 200. I/O device 281 subsequently transfers packet 270 to interconnection 285. In some embodiments, processor 210 may receive an indication that a packet such as packet 270 is to be transferred. In some embodiments, processor 210 transfers packet 270 directly from register circuit 263 to I/O device 281 without using memory device 230. In some embodiments, in addition to transferring packet 270 directly to I/O device 281, processor 210 may also transfer a packet descriptor associated with packet 270 directly to I/O device 281.

In embodiments represented by FIG. 2, packet 270 is transferred from processor 210 to I/O device on transfer path 222 via processor interconnection 212 and chipset 220. In some embodiments, packet 270 is transferred directly to I/O device 281 via a dedicated connection that connects directly between processor 210 and I/O device 281. For example, packet 270 may be transferred directly to I/O device 281 via a direct connection such as connection 187 of FIG. 1.

Transferring packet 270 directly from register circuit 263 to I/O device 281 may reduce memory bandwidth requirement for system 100. Transferring packet 270 directly from register circuit 263 to I/O device 281 may also reduce or eliminate activities such as accessing memory device 230 and interrupts associated the memory access. Further, transferring packet 270 directly from register circuit 263 to I/O device 281 allows communication between processor 210 and I/O device 281 to be performed directly through register circuit 263 and I/O device 281 without the use of interrupts and the use of memory device 230. Reducing or eliminating activities involving memory device 230, such as memory access and interrupts may increase the throughput of processor 210.

As described above, system 200 allows packet 270 to be transferred directly between processor 210 and I/O device 281. Since a packet such as packet 270 may be transferred directly between processor 210 and I/O device 281, the overall latency associated with a transfer of a packet or packets to and from system 200 via interconnection 285 is reduced.

In FIG. 3, system 300 includes a processor 310, a processor interconnection 312, a chipset 320, a memory device 330, a memory interconnection 331, an I/O device 381, and I/O interconnection 384. A packet 370 represents data transferred to and from system via interconnection 385. Packet 370 includes a header 371 and a payload 372. In some embodiments, packet 370 includes data that complies with a protocol including TCP/IP. FIG. 3 shows only one packet for clarity. In some embodiments, system 300 transfers multiple packets; the multiple packets are transferred to and from system 300 in a fashion similar to the fashion that packet 370 is transferred. As shown in FIG. 3, packet 370 is transferred directly from I/O device 381 to processor 310 via a transfer path 322, bypassing memory device 330.

Processor 310 includes a processing unit 361, a cache memory circuit 362, and a register circuit 363. Processing unit 361 processes data based on instructions 364. Instructions 364 include machine-executable codes. Cache memory circuit 362 holds instructions and data recently used by processor 310. Register circuit 363 includes register cells to hold data including header 371 and any packet descriptor associated with packet 370. For clarity, FIG. 3 omits details of the components of processor 310 to concentrate on the subject matter of the embodiments of the invention. In some embodiments, processor 310 is compatible with the Intel® Architecture (IA) processor, such as the IA-32 and the IA-64 architectures.

In FIG. 3, after packet 370 is received by I/O device 381, header 317 is placed directly into register circuit 363 whereas payload 372 is placed directly into cache memory circuit 362. As shown in FIG. 3, neither header 371 nor payload 372 of packet 370 is transferred from I/O device 381 to memory device 330. Thus, in system 300, neither a copy of header 371 nor a copy of payload 372 is placed into memory device 330 when header 371 and payload 372 are transferred from I/O device 381 to processor 310.

In some embodiments, placing header 371 directly into register circuit 363 allows processing unit 361 to begin processing header 371 without searching cache memory circuit 362 for information associated with a header 371 of packet 370. Therefore, system 300 may reduce or eliminate a latency associated with a cache search when processing of a packet such as packet 370.

Placing header 371 directly into register circuit 363 and placing payload 372 directly into cache memory circuit may reduce or eliminate the latency associated with an interrupt request to processor 310 by the I/O device 381. The throughput of processor 310 may be improved when the latency is reduced or eliminated.

In some conventional systems, a placement of a packet such as packet 370 into cache memory circuit such as cache memory circuit 362 may cause slower processing of the packet because the cache lines containing the packet may be evicted or overwritten by other processes of the system before the packet is processed. In some of these conventional systems, the cache line eviction may occur because the time elapsed between the placement of the packet and the system interrupt service routine (which causes the packet to be processed) is a variable factor. This variable factor, in some cases, may cause the cache lines containing the packet to be evicted before the packet is processed. Thus, slower processing of the packet may occur because the packet may need to be re-fetched and placed back into the cache memory circuit for processing.

In system 300, the combination of the direct placement of header 371 into register circuit 363 and the direct placement of payload 372 into cache memory circuit 362 improves the timing to process payload 372. In system 300, for example, a light weight thread may be present and is executed upon the arrival of header 371 in register circuit 363 so that payload 372 in cache memory circuit 362 is quickly processed before any cache line overwriting occurs.

Moreover, in system 300, since packet 370 is directly placed into processor 310, retrieving the packet from a memory device such as memory device 330 is unnecessary. Thus, in system 300, the latency associated with the retrieval of the packet from the memory device 330 may be reduced or eliminated. The throughput of processor 310 may be improved when the latency is reduced or eliminated.

In embodiments represented by FIG. 3, packet 370 is transferred to processor 310 by chipset 320 via processor interconnection 312. In some embodiments, packet 370 is transferred directly to processor 310 via a dedicated connection that connects directly between processor 310 and I/O device 381. For example, packet 370 may be transferred directly to processor 310 via a connection such as connection 187 of FIG. 1. A further reduction in latency may be achieved when a direct connection is used because chipset 320 may not be directly involved in the transfer of packet 370 from I/O device 381 to processor 310.

The above description describes a direct placement of packet 370 into processor 310 when packet 370 is transferred to system 300. As mentioned above, packet 370 also represents data transferred from system 300. When packet 370 is transferred from system 300, packet 370 is initially transferred to I/O device 381 by a component within system 300. I/O device 381 subsequently transfers packet 370 to interconnection 385. In some embodiments, packet 370 may be directly transferred from processor 310 to I/O device 381 without using memory device 330. Transferring packet 370 directly from processor 310 to I/O device 381 may reduce or eliminate activities such as accessing the memory device 330 and interrupts associated the memory access. Reducing or eliminating activities involving memory device 330, such as memory access and interrupts, may increase the throughput of processor 310.

In embodiments represented by FIG. 3, packet 370 is transferred from processor 310 to I/O device 381 on transfer path 322 via processor interconnection 312 and chipset 320. In some embodiments, packet 370 is transferred directly to I/O device 381 via a dedicated connection that connects directly between processor 310 and I/O device 381. For example, packet 370 may be transferred directly to I/O device 381 via a direct connection such as connection 187 of FIG. 1.

In FIG. 4, system 400 includes a processor 410, a processor interconnection 412, a chipset 420, a memory device 430, a memory interconnection 431, an I/O device 481, and I/O interconnection 484. A packet 470 represents data transferred to and from system via interconnection 485. Packet 470 includes a header 471 and a payload 472. In some embodiments, packet 470 includes data that complies with a protocol including TCP/IP. FIG. 4 shows only one packet for clarity. In some embodiments, system 400 transfers multiple packets; the multiple packets are transferred to and from system 400 in a fashion similar to the fashion that packet 470 is transferred.

Processor 410 includes a processing unit 461, a cache memory circuit 462, and a register circuit 463. Processing unit 461 processes data based on instructions 464. Instructions 464 include machine-executable codes. Cache memory circuit 462 holds instructions and data recently used by processor 410. Register circuit 463 includes register cells to hold data including data including header 471 and any packet descriptor associated with packet 470. For clarity, FIG. 4 omits details of the components of processor 410 to concentrate on the subject matter of the embodiments of the invention. In some embodiments, processor 410 is compatible with the Intel® Architecture (IA) processor, such as the IA-32 and the IA-64 architectures.

In FIG. 4, after packet 470 is received by I/O device 481, header 417 is placed directly into register circuit 463 via transfer path 422 and payload 472 is placed into memory device 430 via transfer path 424. Transfer path 422 includes processor interconnection 412. Transfer path 424 includes memory interconnection 431.

In embodiments represented by FIG. 4, chipset 420 transfers header 471 to register circuit 463 of processor 410 and payload 472 to memory device 430. In some embodiments, instead of using chipset 420, processor 410 of FIG. 4 may include a memory control circuit to control the transfer of packet 470 between I/O device 481 and processor 410 and memory device 430. In these embodiments, I/O device 481 may transfer packet 470 directly with processor 410 via a dedicated connection that connects directly between processor 410 and I/O device 481. For example, packet 470 may be transferred directly to processor 410 via a direct connection such as connection 187 of FIG. 1. As another example, an input/output control hub such as ICH 122 of FIG. 1 may be inserted between I/O device 481 and processor 410 to allow the transfer of packet 470 between I/O device 481 and processor 410. A further reduction in latency may be achieved when a direct connection is used because a memory controller hub such as MCH 121 of chipset 120 of FIG. 1 may not be directly involved in the transfer of packet 470 from I/O device 481 to processor 410.

As shown in FIG. 4, header 471 of packet 470 is transferred directly from I/O device 481 to processor 410, bypassing memory device 430. In some embodiments, the placement of payload 472 into memory device 430 may be invisible to caching protocol in processor 410 until payload 472 is accessed by an application. In system 400, a data movement engine (DMM) 444 performs a data movement to move payload 472 from one memory location in memory device 430 to another memory location in memory device 430. For example, payload 472 may be initially placed into a first memory location designated by a driver; data movement engine 444 may move payload 472 to a second memory location designated by an application when the application is ready to access payload 472.

In some embodiments, data movement engine 444 moves payload 472 between different memory locations within memory device 430 without directly using a processing functions of processor 410. In some embodiments, data movement engine 444 includes a direct memory access engine. In some embodiments, data movement engine 444 resides inside processor 410. An example of data movement engine 444 is disclosed in U.S. patent application Ser. No. 10/815,895.

In some embodiments, placing packet 470 directly into register circuit 463 allows processing unit 461 to begin processing packet 470 without searching cache memory circuit 462 for information associated with packet 470. Therefore, system 400 may reduce or eliminate a latency associated with a cache search or cache snoop when processing of a packet such as packet 470.

Further, placing header 471 of packet 470 directly into register circuit 463 may reduce or eliminate the latency associated with an interrupt request to the processor 410 by the I/O device 481. Therefore, in system 400, the latency associated with an interrupt request from the I/O to processor 410 device may be reduced or eliminated. The throughput of processor 410 may be improved when the latency is reduced or eliminated.

The above description describes a direct placement of header 471 into processor 410 when packet 470 is transferred to system 400. As mentioned above, packet 470 also represents data transferred from system 400. When packet 470 is transferred from system 400, packet 470 is initially transferred to I/O device 481 by a component within system 400. I/O device 481 subsequently transfers packet 470 to interconnection 485. In some embodiments, processor 410 transfers header 471 or a packet descriptor associated with packet 470 directly to I/O device 481. Based on the information carried by header 471 or by the packet descriptor, I/O device 481 retrieves payload 472 from memory device 430 for subsequent transfer to interconnection 485.

In embodiments represented by FIG. 4, header 471 or the packet descriptor associated with packet 470 is transferred from processor 410 to I/O device 481 on transfer path 422 via processor interconnection 412 and chipset 420. In some embodiments, header 471 or the packet descriptor is transferred directly to I/O device 481 via a dedicated connection that connects directly between processor 410 and I/O device 481. For example, packet 470 may be transferred directly to I/O device 481 via a direct connection such as connection 187 of FIG. 1.

Figure 5:
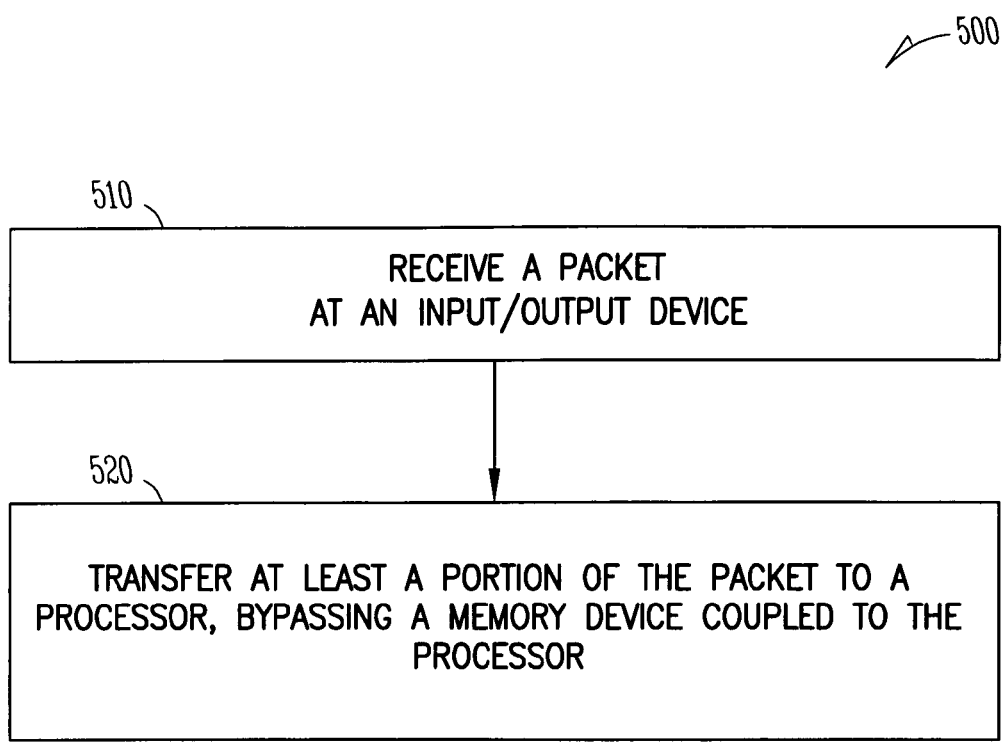
FIG. 5 is a flowchart showing a method according to an embodiment of the invention.

FIG. 5 is a flowchart showing a method according to an embodiment of the invention. Method 500 transfers a packet in a system in which the packet is received at an I/O device from a source such as from a network. In some embodiments, the system of method 500 includes systems 100, 200, 300, and 400 described in FIG. 1 through FIG. 4.

In box 510, method 500 receives a packet at the I/O device. In some embodiments, the packet is transferred to the system from a network such as from a local area network or from the internet. Examples of the I/O device include the I/O devices of system 100 of FIG. 1 in which the I/O devices include network interface cards. In some embodiments, the packet includes data that complies with a protocol including TCP/IP.

In box 520, method 500 transfers at least a portion of the packet to a processor. The packet includes a header and a payload. "At least a portion of the packet" in box 520 means the header of packet, or the payload of the packet, or the combination of both the header and payload of the packet. In embodiments where the packet is associated with a packet descriptor, "at least a portion of the packet" in box 520 means the header of packet, the payload of the packet, the packet descriptor associated with the packet, or the combination of both the packet and the packet descriptor.

Also in box 520, "bypassing a memory device" means that the portion of the packet is transferred only from the I/O device to the processor without transferring the portion of the packet to the memory device.

In some embodiments, method 500 places both the header and the payload directly into a register circuit of the processor, bypassing the memory device. In other embodiments, method 500 bypasses the memory device by placing the header directly into the register of the processor and by placing the payload directly into a cache memory circuit of the processor. In some other embodiments, method 500 places the header directly into the register of the processor, bypassing the memory device, and places the payload into the memory device.

In some embodiments, a chipset of the system transfers the portion of the packet from the I/O device to the processor via a processor interconnection that connects between the chipset and the processor. In other embodiments, the portion of the packet is transferred directly from the I/O device to the processor via a dedicated connection that connects directly between the I/O device and the processor.

Placing the packet directly into the register circuit of the processor allows the processor to reduce or eliminate a cache access to the cache memory circuit of the processor to search for information associated with the packet. The throughput of the processor in method 500 may be improved when the cache access is reduced or eliminated.

Further, placing the packet directly into the register circuit of the processor reduces or eliminates the latency associated with interrupt requests to the processor by the I/O device. The throughput of the processor in method 500 may be improved when the latency associated with interrupt requests by the I/O device is reduced or eliminated.

In method 500, multiple packets may be transferred to the processor in a fashion similar to the fashion described in FIG. 5.

Figure 6:
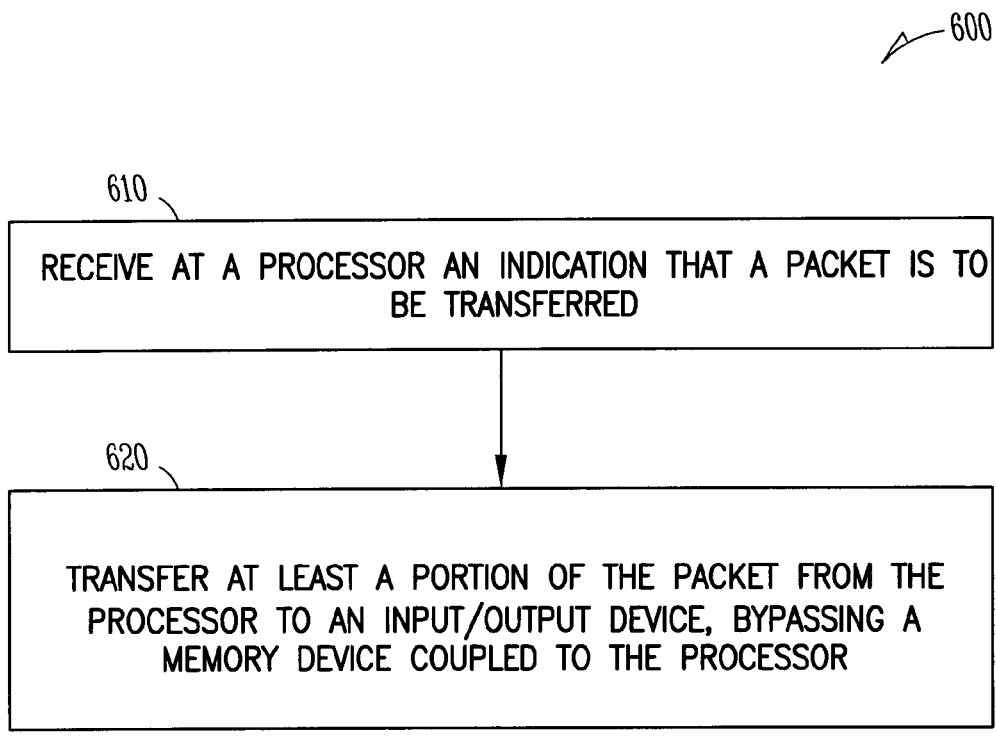
FIG. 6 is a flowchart showing a method according to another embodiment of the invention.

FIG. 6 is a flowchart showing a method according to another embodiment of the invention. Method 600 transfers packets in a system in which the packets transferred from an I/O device of the system to a network. In some embodiments, the system of method 600 includes systems 100, 200, 300, and 400 described in FIG. 1 through FIG. 4.

In box 610, a processor receives an indication that a packet is to be transferred to the I/O device from a source within the system. In some embodiments, the packet includes data that complies with a protocol including TCP/IP.

In box 620, method 600 transfers at least a portion of the packet from the processor to the I/O device. The packet includes a header and a payload.

In some embodiments, the processor transfers the packet directly from a register circuit of the processor to the I/O device, bypassing a memory device outside the processor. In addition to transferring the packet directly to the I/O device, the processor may also transfer a packet descriptor associated with the packet directly from the register circuit to the I/O device.

In other embodiments, the processor transfers the payload of the packet directly from a cache memory circuit the processor to the I/O device, bypassing the memory device. In addition to transferring the payload of the packet directly to the I/O device, the processor may also transfer a packet descriptor associated with the packet directly from the cache memory circuit to the I/O device.

In some other embodiments, the processor transfers the header of the packet or a packet descriptor associated with the packet directly from the register circuit of the processor to the I/O device. Based on the information carried by the packet descriptor, the I/O retrieves the payload from the memory device for subsequent transfer to other systems.

By transferring at least a portion of the packet directly from the processor to the I/O device, method 600 may have a simpler packet transfer than that of some conventional systems.

In some conventional systems, before packets are transferred to the I/O device for transferring to a network, the packets are placed into a memory location in the memory device. The processor then points out to the I/O device the memory location containing the packets so that the I/O device can pull the packets into the I/O device for transferring to the network.

Some of these conventional systems have a ring buffer structure resides in the memory device. The ring buffer allows the processor to update pointers and allows the I/O device to indicate completion progress while the I/O device transfers the packets. The ring buffer is usually elastic to accommodate variations in the transfer speed of the I/O device.

In these conventional systems, accessing the memory device during the transfer of the packet involves the processor writing the packets to the memory device, creating descriptors for the I/O device, and reading from the memory device to track the progress of the I/O device. Accessing the memory device during the transfer of the packets in the conventional systems also involves the I/O device reading the packets and the descriptors from the memory device, and writing back descriptors to update transfer progress to the processor.

The memory accesses by the processor and the I/O device in some conventional systems, as discussed above, consume memory bandwidth and associated cache entries in a cache memory circuit. Moreover, interrupts between the I/O device and the processor create timing overhead. Thus, in some conventional systems, using the memory device during the transfer of packets to the I/O device may consume an inordinate amount of processor time compared with the total amount of time for the processor to execute a protocol stack (procedures and programs) such as the TCP/IP stack to handle the transfer of the packets.

In method 600, by transferring the packet directly from the processor to the I/O device, activity such as accessing the memory devices by the processor and by the I/O device may be eliminated.

Further, in method 600, since the packet is transferred directly from the processor to the I/O device, communication between the processor and I/O device may also be performed directly through register circuits in the processor and I/O device without the use of interrupts and the use of the memory device. Further in method 600, since the packet is transferred directly from the processor to the I/O device, the use of descriptors in the memory device to the keep the progress of packet transmission may be eliminated. When the use of the descriptors is eliminated in method 600, the I/O device may transfer status directly into a processor register to indicate the progress of packet transmission and the remaining transmit buffer capacity in the I/O device. Thus, an improved transfer between the processor and the I/O device may be achieved.

Thus, transferring the packet directly from the processor to the I/O device, using method 600 discussed in FIG. 6 above, may reduce the overall latency of the transfer of packets between the system of method 600 and other systems in the network, leading to an improved throughput of the processor and the system.

The individual activities shown in FIG. 5 and FIG. 6 do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated.

The above description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar components throughout the several views. Examples merely typify possible variations. Portions and features of some embodiments may be included in or substituted for those of others. Many other embodiments will be apparent to those of skill in the art upon reading and understanding the above description. For example, instead of transferring data between a processor and an I/O device as described in FIG. 1 through FIG. 6, the embodiments described herein may also be used for transferring data between two processors such as between processors 110 and 111 of FIG. 1, or between a processor and another component in the system. As another example, in instead of placing data into a register circuit of a processor such as the register circuits described FIG. 2 through FIG. 6, the data may be placed into an uncacheable memory area in the processor. Therefore, the scope of various embodiments is determined by the appended claims, along with the full range of equivalents to which such claims are entitled.

What is claimed is:

1. A method comprising:
   receiving a first portion and a second portion of at least one packet at an input/output device; and
   transferring the first portion between a register circuit of a processor and the input/output device without transferring the first portion to a memory device coupled to the processor; and
   transferring the second portion between a cache memory circuit of the processor and the input/output device without transferring the second portion to the memory device.

2. The method of claim 1, wherein transferring one of the first and second portions is performed without accessing the cache memory circuit of the processor to search for information associated with the packet.

3. The method of claim 2, wherein the processor processes the first and second portions without receiving from the input/output device an interrupt request associated with the packet.

4. The method of claim 1, wherein the first portion includes a header of the packet.

5. The method of claim 4, wherein the second portion includes a payload of the packet.

6. The method of claim 1, wherein the packet is complied with TCP/IP (Transport Control Protocol/Internet Protocol).

7. The method of claim 1 further comprising:
   transferring between the register circuit of the processor and the input/output device a packet descriptor associated with the packet without transferring the packet descriptor to the memory device.

8. An apparatus comprising:
   a register circuit to receive a first portion of a packet from an input/output device;
   a cache memory circuit to receive a second portion of the packet; and
   a processing unit to process the first and second portions of the packet based on instructions in the processing unit, the processing unit and the register circuit residing on a processor, wherein the first portion of the packet is placed into the register circuit of the processor, bypassing a memory device coupled to the processor, and wherein the second portion of the packet is placed into the cache memory circuit of the processor, bypassing the memory device.

9. The apparatus of claim 8, wherein the processing unit is configured to process the first portion of the packet without searching the cache memory circuit for information associated with the packet.

10. The apparatus of claim 9, wherein the processing unit is configured to process the first and second portions of the packet without receiving from the input/output device an interrupt request associated with the packet.

11. The apparatus of claim 8, wherein the register circuit is configured to receive a header of the package and the cache memory circuit is configured to receive a payload of the packet, and wherein the second portion of the package includes the payload and the first portion of the packet includes the header.

12. The apparatus of claim 11, wherein the register circuit is configured to send at least one outgoing packet directly to the input/output device, bypassing the memory device.

13. The apparatus of claim 8, wherein the cache memory circuit is configured to send at least one outgoing payload directly to the input/output device, bypassing the memory device.

14. The apparatus of claim 8, wherein the processor includes a number of terminals to connect the processor directly to the input/output device via a connection to allow the processor to communicate directly with the input/output device via the connection.

15. The apparatus of claim 8, wherein the processor includes a number of terminals to indirectly connect the processor to the input/output device via a shared interconnection.

16. An article including a machine-accessible medium having associated information, wherein the information, when accessed, results in a machine performing:
   receiving a first portion and a second portion of at least one packet at an input/output device; and
   transferring the first portion between a register circuit of a processor and the input/output device without transferring the first portion to a memory device coupled to the processor; and
   transferring the second portion between a cache memory circuit of the processor and the input/output device without transferring the second portion to the memory device.

17. The article of claim 16, wherein transferring one of the first and second portions is performed without accessing the cache memory circuit of the processor to search for information associated with the packet.

18. The article of claim 17, wherein the processor processes the first and second portions without receiving from the input/output device an interrupt request associated with the packet.

19. The article of claim 16, wherein the first portion includes a header of the packet.

20. The article of claim 19, wherein the second portion includes a payload of the packet.

* * * * *